(12) United States Patent
Li et al.

(10) Patent No.: US 10,676,080 B2
(45) Date of Patent: Jun. 9, 2020

(54) CONTROL STRATEGIES FOR A HYBRID VEHICLE

(71) Applicant: GM GLOBAL TECHNOLOGY OPERATIONS LLC, Detroit, MI (US)

(72) Inventors: Dongxu Li, Troy, MI (US); Norman K. Bucknor, Troy, MI (US); Chunhao J. Lee, Troy, MI (US); Venkata Prasad Atluri, Novi, MI (US); Neeraj Shidore, Novi, MI (US); Farzad Samie, Franklin, MI (US); Derek F. Lahr, Howell, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 61 days.

(21) Appl. No.: 16/126,654

(22) Filed: Sep. 10, 2018

(65) Prior Publication Data
US 2020/0079351 A1    Mar. 12, 2020

(51) Int. Cl.
| | | |
|---|---|---|
| *B60W 10/02* | (2006.01) | |
| *B60W 20/13* | (2016.01) | |
| *B60W 20/40* | (2016.01) | |
| *B60W 10/06* | (2006.01) | |
| *B60W 10/08* | (2006.01) | |
| *B60W 30/192* | (2012.01) | |

(52) U.S. Cl.
CPC ............ *B60W 20/40* (2013.01); *B60W 10/02* (2013.01); *B60W 10/06* (2013.01); *B60W 10/08* (2013.01); *B60W 20/13* (2016.01); *B60W 30/192* (2013.01); *B60W 2710/02* (2013.01); *B60W 2710/06* (2013.01); *B60W 2710/08* (2013.01)

(58) Field of Classification Search
CPC ...... B60W 20/13; B60W 20/40; B60W 10/02; B60W 10/06; B60W 10/08; B60W 30/192; B60W 2710/02; B60W 2710/06; B60W 2710/08
See application file for complete search history.

(56) References Cited

U.S. PATENT DOCUMENTS

| | | | | |
|---|---|---|---|---|
| 6,557,656 B2 * | 5/2003 | Haniu | ...................... | B60K 6/24 180/65.21 |
| 2013/0297161 A1 * | 11/2013 | Gibson | ................. | B60W 20/00 701/54 |

* cited by examiner

*Primary Examiner* — Bryan A Evans
(74) *Attorney, Agent, or Firm* — Reising Ethington P.C.; James E. Howard (57) ABSTRACT

Hybrid vehicles and methods of operating the same are disclosed. Example methods may include providing a powertrain for the vehicle, which includes an internal combustion engine configured to provide rotational power to a rotatable input of a transmission by way of a starting device, and an electric motor-generator comprising a rotor configured to selectively provide rotational power to the rotatable input. The method may further include selectively disconnecting the engine from the rotatable input using a disconnect device separate from the starting device, thereby allowing the rotatable input of the transmission to be driven at a speed faster than an output speed of the engine.

20 Claims, 4 Drawing Sheets

CONTROL STRATEGIES FOR A HYBRID VEHICLE

INTRODUCTION

Hybrid vehicles typically employ an electric motor-generator in addition to an internal combustion (IC) engine for selectively providing motive force to a final drive unit of the vehicle. Hybrid vehicles may rely upon the electric motor-generator and IC engine to varying degrees. In other words, some hybrid vehicles rely primarily upon the IC engine to supply power to the final drive unit, while other hybrid vehicles are driven primarily or even exclusively by the electric motor-generator (while the IC engine either recharges batteries supplying electrical power to the electric motor-generator or supplies additional driving power for the vehicle when demanded).

Hybrid vehicles may be designed as a "strong" hybrid having a relatively powerful electric motor-generator that carries a larger share of the responsibility for providing propulsive power to the vehicle. Alternatively, some hybrid vehicles are designed as "mild" hybrids that employ relatively smaller electric motor-generators, which allow somewhat smaller gains in fuel efficiency compared with strong hybrids, while offering lower overall costs than a strong hybrid due to the reduced size electric motor.

Hybrid vehicles typically need to disconnect the IC engine and/or electric motor-generator from rotating components of the vehicle, e.g., when the IC engine and/or motor-generator is/are not actively supplying power to the vehicle. Disconnect clutches typical of previous approaches, such as wet disconnect clutches, are generally slow and/or imprecise in the engagement/disengagement of rotating components, and thus there are lost opportunities for increasing efficiency of a vehicle driveline. These lost opportunities are particularly significant in the context of a mild hybrid vehicle, in which the generally less capable electric motor-generators have fewer opportunities, relative to hybrids with more powerful electric motor-generators, to provide meaningful assistive power to the vehicle.

Accordingly, there is a need for an improved powertrain for a vehicle and method of operating a vehicle powertrain that address the above problems.

SUMMARY

In at least some example approaches, a method of operating a hybrid powertrain for a vehicle including providing a powertrain for the vehicle comprising an internal combustion engine configured to provide rotational power to a rotatable input of a transmission by way of a starting device, an electric motor-generator comprising a rotor configured to selectively provide rotational power to the rotatable input. The method may further include selectively disconnecting the engine from the rotatable input using a disconnect device separate from the starting device, thereby allowing the rotatable input of the transmission to be driven at a speed faster than an output speed of the engine.

In some examples, the method further includes driving the rotatable input of the transmission using the motor-generator while the engine is disconnected using the disconnect device.

In other approaches, a method also includes turning the engine with one of the motor-generator and a starter motor of the engine while cutting fuel to the engine. In some of these examples, the method may further include determining that the vehicle is at or below a motor-generator capable calibration speed, wherein the motor-generator is capable of meeting a vehicle acceleration requirement without assistance from the engine, wherein the engine is turned with the one of the motor-generator and the starter in response to the determination. In at least some of such examples, determining that the vehicle is at or below a motor-generator capable calibration speed includes determining that the vehicle is one of stationary and coasting. A motor-generator capable calibration speed, in some examples, may be determined from at least a vehicle weight, a motor-generator power and an engine engagement capability with the transmission via the starting device when the starting device is in a non-slip condition.

In some of the example methods, the engine is disconnected in response to a determination that the vehicle is coasting, with the method further including detecting a demand for an acceleration of the vehicle and, in response to this determination, providing rotational power to the rotational input using one of the electric motor-generator and a vehicle starter.

In at least some of the example methods, the disconnect device is a mechanical clutch. Example mechanical clutches may include one of a one-way clutch, a selectable one-way clutch, and a mechanical diode.

In some examples, the starting device is a torque converter comprising a pump element and turbine separated by a fluid coupling. In some of these examples, the disconnect device is interposed between the engine and the pump element of the torque converter, and the electric motor-generator is configured to drive the pump element of the torque converter. In other such examples, the disconnect device may be interposed between the turbine of the torque converter and the transmission, and the electric motor-generator is configured to drive the rotational input of the transmission.

In some example methods, the vehicle is a mild hybrid, wherein the engine is a primary motive power source for the powertrain, and the motor-generator is a secondary motive power source for the powertrain.

Some example methods may further include launching the vehicle from a stop while the engine is disconnected from the rotational input. In these examples, some methods may further include reconnecting the engine in response to a demand for power exceeding an output capability of the electric motor-generator.

In at least some examples, a hybrid vehicle includes a final drive unit driving at least one vehicle wheel and a drivetrain providing motive force to the final drive unit. The drivetrain may include an internal combustion engine configured to provide rotational power to a rotatable input of a transmission through a starting device, and an electric motor-generator configured to drive the rotational input of the transmission, such that the electric motor-generator is configured to selectively provide rotational power to the transmission. The drivetrain may further include an engine disconnect device separate from the starting device, the disconnect device configured to allow the rotatable input of the transmission to be driven at a speed faster than an output speed of the engine. The engine may be configured to be selectively disconnected from the rotatable input by the engine disconnect device, and the engine is configured to be turned with one of the motor-generator and a starter motor of the engine while fuel is cut to the engine In at least some examples, the disconnect device includes a one-way clutch, a selectable one-way clutch, or a mechanical diode.

In some examples, the starting device is a torque converter comprising a pump element and a turbine separated by a fluid coupling. In these examples, the disconnect device may be interposed between the engine and the pump element of the torque converter, and the electric motor-generator is configured to drive the pump element of the torque converter. In other such examples, the disconnect device is interposed between the turbine of the torque converter and the transmission, and the electric motor-generator is configured to drive the rotational input of the transmission.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION

Example Hybrid Vehicles

According to example illustrations herein, various hybrid vehicles and methods of operating the same are disclosed. The example hybrids may be relatively mild hybrid designs, where an electric motor-generator carries a lesser share of propulsive duties for the vehicle. In such examples, the power limitations of the electric motor-generator units benefit from some additional coordination of the process of disconnecting and reconnecting the engine in transitions from engine-on to engine-off operating modes or vice versa, in order to provide a beneficial compromise between fuel economy and drivability. Nevertheless, the concepts and methodologies discussed herein are equally applicable to strong hybrids as well. Moreover, example hybrid methods and devices as disclosed herein may be particularly well-suited for being "added on" to an existing vehicle or hybrid vehicle powertrain.

Generally, example illustrations herein seek to quickly and smoothly disconnect and reconnect the engine in a hybrid vehicle. Example disconnect devices, to this end, may be a friction clutch or a mechanical diode (e.g., a one-way clutch or selectable one-way clutch).

In some example methods, an electric motor-generator (i.e., of a hybrid powertrain) or a vehicle starter motor may be used to keep the IC engine rotating while disconnected from the drivetrain, so that when the engine is reconnected there is little or no delay in supplying engine power. In other example methods, the engine is fueled and kept running at a reduced speed, e.g., an idle speed, to reduce fuel consumption compared with examples where the engine turned by an external source such as the motor-generator or starter. As will be discussed in more detail below, a coordination of control variables may be used to put example hybrid vehicle systems in different operating modes or strategies, in order to provide a desired blend of fuel efficiency and drivability.

Example hybrid vehicles or powertrains may employ a disconnect device between an internal combustion (IC) engine and drivetrain components receiving power from an associated electric motor-generator unit (MGU), e.g., a rotational input to a starting device of a vehicle transmission. For purposes of this disclosure, a starting device may be a torque converter comprising a pump element and turbine separated by a fluid coupling. In another example, a starting device may be a starting clutch of a transmission, e.g., for a dual-clutch transmission (DCT).

Example disconnect devices may be separate from the starting device or torque converter, such that the IC engine may be disconnected from a rotational input to a transmission by the disconnect device, in a manner apart from any separation or disconnection between the engine and transmission that is afforded by the starting device or torque converter. Example disconnect devices may include mechanical clutches, which for purposes of this disclosure may include, but are not limited to, a mechanical diode, a one-way clutch, or a selectable one-way clutch. In other examples, a friction clutch may be employed. Example mechanical clutches are generally locked in a first rotational direction such that a first rotational element drives a second rotational element in a first rotational direction. Mechanical clutches also allow for freewheeling in a rotational direction opposite to the first direction. In other words, to any extent the second rotational element spins faster than the first rotational element, e.g., when an electric motor-generator is spinning a shaft faster than an output from the IC engine (e.g., when the IC engine is slowing down or shut off), the first rotational element does not significantly brake or drag the second rotational element. Moreover, when the speed of the first rotational element subsequently increases and reaches the same rotating speed as the second rotational element in the first rotational direction (e.g., when the engine is restarted or accelerated in speed due to demand by the driver), there is no discernible delay in the first rotational element engaging with and driving the second rotational element. In this manner, an IC engine may quickly and smoothly transition from a shutoff or idle state to actively providing motive force to the powertrain, and vice-versa. The lack of a delay is due to the mechanical clutch immediately passing rotational driving force on from the first rotational element to the second rotational element.

The lack of delay and relatively quick engagement/disengagement of mechanical clutches is distinguished from, for example, wet disconnect clutches typical of previous approaches in hybrid vehicles. A wet disconnect clutch generally relies upon hydraulic pressure that applies force between two rotational elements, and thus delays synchronization of rotational speeds of the first and second rotational elements while pressure and/or friction builds between the rotational elements sufficient to cause synchronization of the rotational speeds of each.

The relatively quicker engagement/disengagement of the mechanical clutch, by contrast, may generally improve drivability of the hybrid vehicle and make transitions between hybrid powertrain operating states less discernible to vehicle occupants. More specifically, drivability may be enhanced by a smoother engagement/disengagement of the IC engine during transitions between operating states of the powertrain, e.g., when the IC engine is transitioning from an operating state where the IC engine provides motive force to the powertrain at least in part, to an operating state where the IC engine is shut off entirely or otherwise not providing motive force to the powertrain. These advantages in drivability may be particularly beneficial where an electric motor-generator is relatively powerful or more often used to provide motive force to a vehicle final drive unit, as the IC engine may be relied upon to a lesser extent. As such, hybrid vehicles using larger or more powerful electric motor-generator units in combination with an example mechanical clutch as a disconnect device increase fuel efficiency by limiting use of the IC engine to a greater degree due to the increased power and usability of the electric motor-generator, while minimizing the intrusiveness or harshness of transitions between at least the operating states described above. The example disconnect devices disclosed herein may also facilitate the disconnecting of an IC engine more often in situations where power from the IC engine is not needed, thereby allowing more opportunities for shutoff of the engine, and in turn increased efficiency of the vehicle.

In some examples below, a hybrid vehicle employs a "P2" drivetrain configuration. In such configurations, an electric motor-generator unit (MGU) applies power to a vehicle drivetrain in between an IC engine and a multi-gear transmission. Accordingly, the hybrid vehicle may be driven by the MGU alone, by the IC engine alone, or by both the MGU and IC engine together. The "P2" type hybrid drivetrains may be well-suited for being added on to an existing vehicle or drivetrain design, e.g., by adding on a motor-generator and disconnect devices to a vehicle originally designed as an IC engine (only) vehicle. The concepts herein may nevertheless be applied to other types of hybrid vehicles, such as "P1" configurations (where the MGU is linked to the internal combustion engine more directly, e.g., to an output shaft of the engine) or "P4" configurations (where the MGU is integrated into the driveline or an axle of the vehicle, downstream of the transmission receiving power from the engine), merely as examples.

Figure 1A:
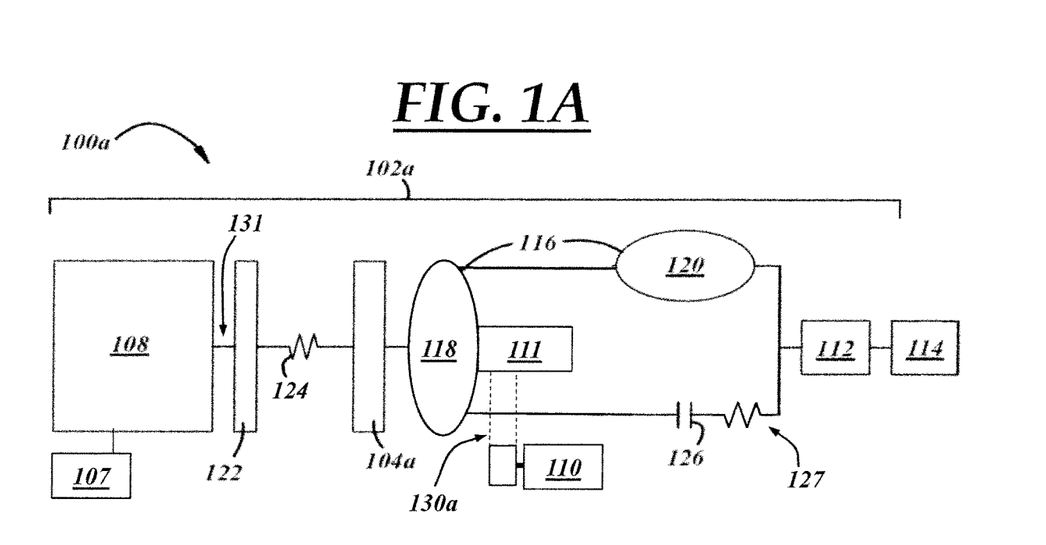
FIG. 1A is a schematic diagram depicting a hybrid vehicle and powertrain having a disconnect device, according to one example approach.
Figure 1B:
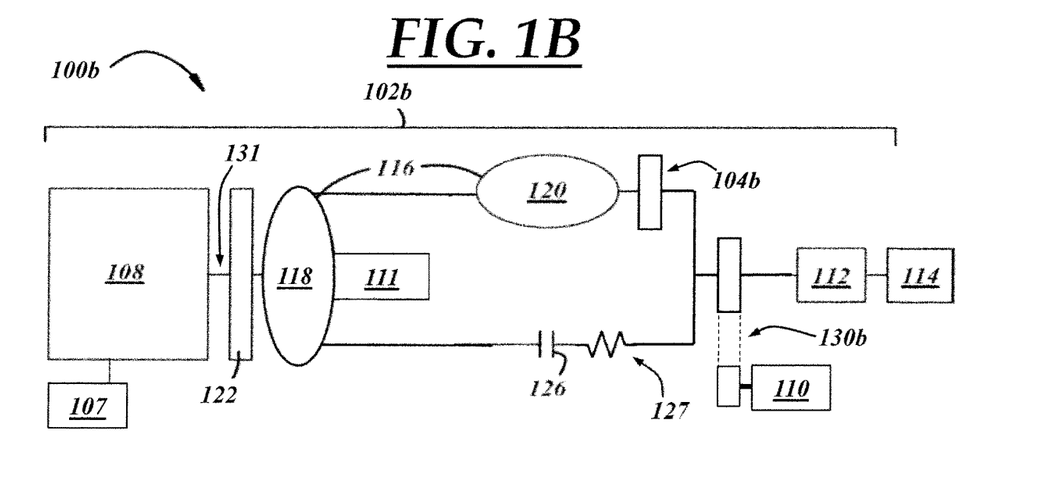
FIG. 1B is a schematic diagram depicting a hybrid vehicle and powertrain having a disconnect device, according to another example.

Turning now to FIGS. 1A and 1B, example illustrations of hybrid vehicles and powertrains having disconnect devices will be described in further detail. More specifically, FIGS. 1A and 1B are schematic illustrations of a hybrid vehicle 100a and 100b, respectively (collectively referred to as hybrid vehicle 100). FIGS. 1A and 1B are sectional views of a hybrid powertrain 102a and 102b, respectively (collectively referred to as hybrid powertrain 102). In both of these examples, the powertrain 102 of hybrid vehicle 100 includes a disconnect device consistent with the above-discussed advantages. In each example, a mechanical clutch 104 is employed as an engine disconnect device. More specifically, the powertrain 102a of vehicle 100a is provided with a mechanical clutch 104a, which is a selectable one-way clutch (SOWC) that will be described further below. The powertrain 102b of vehicle 100b, on the other hand, is provided with a one-way clutch 104b.

As best seen in the diagrams of FIGS. 1A and 1B, example vehicles 100 generally may be driven by an IC engine 108 and motor-generator unit (MGU) 110 in various operating states to provide motive force to a multi-gear transmission 112, which in turn powers a final drive unit 114. More specifically, a vehicle 100 may be driven at any given time (1) exclusively by the IC engine 108, (2) exclusively by the MGU 110, or (3) by each of the IC engine 108 and MGU 110 simultaneously. Example operating states of the vehicles 100a, 100b and advantages of the mechanical clutch 104 will be described further below. The final drive unit 114 may include a differential, axle, or other shaft arrangement for driving one or more wheels of the vehicle 100. In one example, the final drive unit 114 is a front or rear axle of the vehicle 100.

Example disconnect devices 104 disclosed herein may generally be separate from a starting device 116 of the transmission 112. The starting device 116 may generally permit disconnection or other relative rotation of an input to the transmission 112 and a rotating shaft configured to drive the input to the transmission 112. In the examples illustrated in FIGS. 1A and 1B, the starting device 116 is a torque converter 116. In other approaches, the starting device 116 may be a starting clutch, e.g., of a dual-clutch transmission (DCT). Thus, while a starting device 116 such as the torque converter 116 illustrated in FIGS. 1A and 1B may itself be used to disconnect an engine 102 from the transmission 112 (inasmuch as the fluid coupling of the torque converter 116 permits different rotating speeds of the pump element 118 and turbine 120), the disconnect devices 104 generally allow a further disconnection of the engine 102 that reduces frictional losses or otherwise permits more efficient or quicker disconnection and reconnection of the engine 102.

Example illustrations of a powertrain 102 and vehicle 100 herein are generally applicable to any hybrid vehicle employing an IC engine 108 and MGU 110 selectively to provide motive force to drive the vehicle 100, and having an engine disconnect device consistent with the examples herein. In some examples, a mechanical clutch may be employed as a disconnect device. Mechanical clutches may be of particular use in applications where the MGU 110 is relatively powerful and/or is used to provide motive force to a final drive unit 114 of a vehicle, although mechanical clutches may be used in an application that is convenient. In one example, the MGU 110 is at least a 48 V motor-generator, i.e., having a nominal voltage of at least 48 V. The powertrain 102 may, in some examples, be a mild hybrid powertrain, i.e., where the MGU 110 is used relatively less than the engine 108 to provide propulsion to the vehicle 100 during normal operating conditions.

The transmission 112 may receive motive force or rotational power output by the IC engine 108 and/or MGU 110 by way of the starting device 116, which as noted above is a torque converter 116 in the examples illustrated in FIGS. 1A and 1B. The torque converter 116 employs a fluid coupling to transmit power and multiply torque received by the transmission 112 from the IC engine 108 and/or MGU 110. More specifically, the torque converter may have a torque converter (TC) cover or pump element 118 driving a turbine 120 by way of a fluid coupling. The torque converter 116 may also have a lockup clutch 126 for selectively locking the pump element 118 and turbine 120, e.g., to synchronize rotational speeds of the pump element 118 and turbine 120 and eliminate slip across the fluid coupling during certain operating conditions. The torque converter 116 may also have a damper 127, which is configured to dampen vibrations transmitted by the engine to the torque converter 116, thereby reducing driveline harshness in the powertrain 102.

The MGU 110 may provide motive force to the torque converter 116, transmission 112, and final drive unit 112, either alternatively or in addition to that provided by the IC engine 108. In the example illustrated in FIG. 1A, the MGU 110 may drive a hub 111 of the torque converter pump element 118 by way of a chain drive 130a. Alternatively, as illustrated in FIG. 1B, the MGU 110 may drive an input shaft of the transmission 112 directly, e.g., by way of fixed gears 130b.

As noted above, a disconnect device may be employed to facilitate rapid connecting and disconnecting of the engine 108 to the drivetrain 102. In the examples illustrated in FIGS. 1A and 1B, the disconnect device may be a mechanical clutch 104. While the drivetrains 102a and 102b may be used in substantially similar fashion in the examples herein of disconnecting an engine 108, components of the drivetrains 102a, 102b may operate somewhat differently in some cases. Merely as an example, the torque converter clutch 126 may be opened or closed when an engine 108 is disconnected while the vehicle 100 is being operated by the MGU 110, subject to the requirements of the configurations of the drivetrains 102a and 102b. In the case of a drivetrain where the MGU 110 is connected to the pump-side of the torque converter (e.g., as in drivetrain 102a, where the MGU 110 drives the pump element 118), the torque converter clutch 126 must generally be locked or in a managed slip condition (where at least some rotational power is transferred from the pump element 118 to the turbine 120) for the MGU 110 to provide propulsive power to the transmission 112. Thus, when the engine 108 is disconnected in the drivetrain 102a, the torque converter clutch 126 is typically locked or otherwise transmitting some power from the pump element 118 to the turbine 120. On the other hand, in drivetrain configurations where the MGU is on the turbine-side of the torque converter 116, e.g., the MGU 110 drives an output of the turbine 120 as in the drivetrain 102b, the torque converter clutch 126 should generally be opened (i.e., transmitting substantially no power from the pump element 118 to the turbine 120, and vice versa) when the engine 108 is disconnected. Thus, in the example drivetrain 102b, the torque converter clutch 126 may itself be a disconnect device with respect to the engine 108.

The engine 108 may have an output shaft, e.g., a crankshaft, sending rotational power to a mechanical clutch 104. The crankshaft may turn at a nominal speed of the engine 102. The disconnect devices 104 may generally permit the engine 102 to be stopped, idling, or otherwise turning at a reduced speed compared to an input speed to the transmission 112, e.g., as powered by the MGU 110, or resulting from motion of the vehicle 100. As illustrated in FIGS. 1A and 1B, a flexplate 122 may be provided, which may be secured to the crankshaft/output shaft of the IC engine 108 to generally improve noise/vibration/harshness characteristics of the IC engine 108 by reducing transmission of vibration, noise, or other transient excitations from the engine 108 to other elements of the powertrain 102 and/or vehicle 100. The flexplate 122 also may accommodate flexure of the housing of the torque converter 116 in the axial direction during operation. A damper 124 may also be provided in line with the flexplate 122, e.g., as shown in FIG. 1A, to further reduce transmission of vibrations from the engine 108.

The mechanical clutch 104 of the vehicle 100 generally allows the IC engine 108 to selectively provide power to drive the vehicle 100, either alternatively or in addition to rotational power supplied by the MGU 110, as noted above. In the example illustrated in FIG. 1A, the mechanical clutch may be a selectable one-way clutch (SOWC) 104a. In another example illustrated in FIG. 1B, on the other hand, a one-way clutch 104b may be employed, which connects the turbine 120 of the torque converter 116 to the transmission 112.

In the example of the powertrain 102a illustrated in FIG. 1A, i.e., where the disconnect device is a selectable one-way clutch (SOWC) 104a, the IC engine 108 may drive a rotatable shaft 131 in a first rotational direction, as best seen in FIGS. 1B and 1C. The rotatable shaft 131 may be a crankshaft of the engine 108, or a layshaft coupled with the crankshaft of the engine 108 for rotation, e.g., by way of a fixed gearing. The MGU 110 is configured to selectively provide rotational power to a rotational output, which in the example of FIG. 1A is the hub 111 of the torque converter pump element 118. For example, the motor-generator 110 may include a rotor (not specifically shown) that drives the hub 111, either alternatively or in addition to rotational power being supplied to the pump element 118 from the engine 108. The MGU 110 may also generate electrical power to recharge a vehicle battery (not shown), i.e., by the motion of the vehicle being translated into rotational force transferred by way of the final drive unit 114 and transmission 112 to the chain drive 130a, which is turned by the hub 111 of the pump element 118.

As noted above, the powertrain 102a employs SOWC 104a as an engine disconnect device. The SOWC 104a may selectively lock the rotatable shaft 131 with the rotational output 118 in a first "forward" direction, where (a) the rotatable shaft 131 may drive the rotational output 118 in the first rotational direction, and (b) the rotational output 118 is permitted to freewheel with respect to the rotatable shaft 131 when rotating faster in the first rotational direction than the rotatable shaft 131.

The locking direction of the SOWC 104a may be reversed, e.g., by way of a selector plate (not shown). In this second, "reverse" locked position, the rotatable shaft 131 may be driven by the pump element 118 in the first direction. In this manner, the IC engine 108 may apply an engine braking force to the pump element 118 by way of the rotatable shaft 131. The rotatable shaft 131 may, in this second reverse-locked orientation, freewheel with respect to the pump element 118 if it begins to rotate faster than the pump element 118 in the first rotational direction, e.g., if the vehicle speed falls low enough that the rotating speed of the shaft 131 is higher than the cover 118.

Selective locking of the SOWC 104a in the forward-locked and reverse-locked orientations may be initiated in any manner convenient, e.g., by way of two rotational members that are locked for rotation together via one or more struts, rockers, rollers, or sprags, merely as examples.

In another example illustration shown in FIG. 1B, a mechanical clutch may be provided in the form of a one-way clutch 104b that is interposed between the turbine 120 of the torque converter 120 and the transmission 112. Example one-way clutches 104b may be implemented by way of a roller clutch, sprag clutch, or any other mechanical clutch that generally allows the turbine 120 to drive an input to the transmission 112 in a first rotational direction, while freely allowing relative rotation between the turbine 120 and the input to the transmission 112 in the opposite rotational direction.

Application of a mechanical clutch as an engine disconnect device, e.g., as described above with the SOWC 104a and one-way clutch 104b, can reduce parts and packaging space of the clutch, improve drivability, and reduce fuel consumption. For example, the freewheeling allowed by the SOWC 104a and one-way clutch 104b is generally instantaneous when relative rotation occurs between the rotational members thereof, which may be particularly beneficial when the engine 108 is transitioning from a driving state to a coasting or idling or non-running state. Additionally, drag of a mechanical clutch such as SOWC 104a is relatively low, and re-engagement of the rotating members upon restarting or acceleration of engine speed is nearly instantaneous (as distinguished from the relatively slower and more imprecise engagement typical of a wet disconnect clutch). Merely by way of example, in an operating state where the engine 108 is driving the vehicle 100 (either alone or in addition to the MGU 110) and the driver reduces input from an accelerator to the engine 108 (i.e., to coast), a first rotational member of SOWC 104a or one-way clutch 104b (linked to vehicle speed via rotation of the torque converter cover 118 or transmission 112, respectively) may freewheel with respect to the other rotational member (which is linked to engine speed by way of the shaft 131 or turbine 120, respectively) with little drag. In one example, a mechanical clutch such as that described herein may have a drag of 0.1-0.2 Newton-meters (Nm), compared to 0.5-0.7 Nm drag typical of a wet disconnect clutch. The generally instantaneous freewheel allowed by the SOWC 104a and one-way clutch 104b and low drag improves drivability by reducing reaction forces transmitted through the powertrain 102, and by reducing frictional losses due to drag. Additionally, should the driver wish to again accelerate the vehicle 100 with the engine 108, the reengagement of the rotational members of the SOWC 104a and one-way clutch 104b is almost instantaneous due to the relatively quick engagement or re-engagement of the engagement features typical of mechanical clutches, e.g., sprags, rollers, or the like. By comparison, re-engagement of previous disconnect devices such as a wet disconnect clutch may require a buildup of hydraulic pressure upon a friction disc or the like, which delays disconnecting and re-connecting of the engine 108.

Example Hybrid Vehicle Operating States

The hybrid vehicle 100 may have a number of operating states available while driving, which may generally govern usage of the engine 108 and MGU 110. Initially, the vehicle 100 may be started and the transmission 112 shifted to "drive," or otherwise manipulated to indicate an operator wishes to initiate motion of the vehicle 100. Thus, the vehicle 100 may enter a "start" state, in which the engine 108 and/or the MGU 110 are on standby or otherwise available to respond to demand from the operator of the vehicle 100 to supply propulsion to the vehicle 100. In this "start" state, the engine 108 may be running, e.g., at an idle speed, or may be off.

Upon demand by the vehicle operator, e.g., depressing an accelerator pedal of the vehicle 100, the vehicle 100 may proceed to drive in one of two states. In a first "EV drive" state, the MGU 110 alone may provide propulsion to the vehicle 100, while the engine 108 is not providing propulsive power to the vehicle driveline 102. For example, the engine 108 may be off, with the disconnect device 104 allowing the engine 108 to remain stopped while the vehicle 100 is in motion. Alternatively, the engine 108 may be running/idling. If the engine 108 is running in the "EV drive" state, i.e., and not providing propulsive power to the vehicle 100, the mechanical clutch 104 may allow a rotating member driven by the MGU 110 to rotate at a speed faster than that of the engine 108. Accordingly, the engine 108 may be off, or turning at a relatively low or idling speed, such that the MGU 110 alone is providing propulsion to the vehicle 110.

In a second driving state, the engine 108 may provide propulsion to the vehicle 100, either alternatively or in addition to that provided by the MGU 110. Thus, the MGU 110 may be (1) off entirely such that the engine 108 is driving the vehicle 100; (2) providing assistive power that is combined with that provided by the engine 108; or (3) generating electrical power from the motion of the drivetrain 102, thereby charging a vehicle battery (not specifically shown). In one example, the EV drive state is used initially when a vehicle operator simply removes application of vehicle brakes, i.e., such that the vehicle 100 "creeps" forward. Upon demand for greater acceleration, e.g., by application of the accelerator pedal, the vehicle 100 may transition to one of the driving with engine 108 states.

Transitions may occur between the EV drive state, where the engine 108 is providing propulsive power to the vehicle 100, and other operating states where the engine 108 is not providing propulsive power to the vehicle 100. For example, during an EV drive state, the engine 108 may begin providing propulsive power to the vehicle driveline 102, e.g., upon demand for significantly more power by the vehicle operator. Similarly, when the vehicle 100 is driving using the engine 108 as the primary or sole source of propulsive power to the vehicle driveline 102, the vehicle 100 may transition to an EV drive state, for example where the vehicle 100 is cruising or demand for power is otherwise sufficiently low that the MGU 110 is capable of meeting current vehicle power demands without assistance from the engine 108. Thus, the vehicle 100 may transition between operating states where the engine 108 is used alone or in combination with the MGU 110, and an "EV drive" operating state where the engine 108 does not provide propulsive power to the vehicle 100, to meet desired efficiency, performance, and drivability requirements for the vehicle 100.

The disconnect devices 104 advantageously facilitate a quick disengagement of the engine 108 from the drivetrain 102 in the event power from the engine 108 is not needed. In one example, the vehicle 100 may initiate coasting while in an operating state where the engine 108 is engaged with the drivetrain 102. For example, the vehicle operator may reduce an input to the accelerator pedal, e.g., by releasing the accelerator pedal, after cruising at a given vehicle speed. Should the reduced need for power by the vehicle 100 in the coasting state be sufficiently low that power demands can be met by the MGU 110 alone, the engine 108 may enter one of several modes for reducing fuel use. In a first "off" mode, the engine 108 may be at zero speed, without fuel being supplied to the engine 108. The off mode may reduce fuel usage to zero, but also requires re-starting the engine 108 in response to some demand for the engine 108. In a second deceleration fuel cutoff (DFCO) mode, fuel may also be cut off to the engine 108, however it may be kept spinning by motion of the drivetrain 102 and/or the vehicle 100. This mode thereby reduces fuel consumption and also drivetrain harshness by way of keeping the engine 108 rotating, but draws some nominal amount of power from the motion of the drivetrain 102 and/or the vehicle 100. In a third idle mode, the engine 108 is fueled and rotating at idle speed, which reduces fuel usage, however to a lesser extent than the off or DFCO modes. The idle mode also allows the engine 108 to more smoothly be re-engaged than the off or DFCO modes (and with less delay) upon demand for power from the engine 108. In still another mode, the engine 108 may be unfueled and kept rotating by a motor (e.g., starter 107 or the MGU 110). In this "powered" mode of the engine 108, fuel usage is zero and re-engagement of the engine 108 is also relatively smooth upon demand for power from the engine 108, however powering the engine rotation with the starter 107 or MGU 110 draws additional power that could otherwise be used to power the vehicle 100.

If the operator attempts to slow the vehicle 100, e.g., by applying vehicle brakes, the vehicle 100 may employ regenerative braking using the MGU 110. In other words, the MGU 110 may slow the vehicle 100 by creating electrical power from the rotation of the rotor (not shown) of the MGU 110 due to motion of the drivetrain 102 caused by the vehicle 100. In this regenerative braking operating state, the engine 108 may remain idling, in DFCO mode, or off. If the operator subsequently releases the vehicle brakes or otherwise ceases the demand for such stopping power being applied to the vehicle 100, the vehicle 100 may transition back to the coasting operating state. On the other hand, if the vehicle 100 slows to a stop, the vehicle 100 may transition back to the start operating state described above.

At relatively low vehicle speeds, the engine 108 may not be able to supply immediate power to the drivetrain 102, or it would otherwise be undesirable. For example, if the speed of the vehicle 100 is low enough that the transmission 112 is turning slowly enough that the torque converter turbine 120 speed cannot be synchronized with the pump element 118, it may be beneficial to disconnect the engine 108 from the drivetrain 102 using the mechanical clutch 104. Otherwise, a lockup or substantially no-slip condition between the pump element 118 and the turbine 120 might cause excessive noise/vibration/harshness (NVH) in the drivetrain 102 or vehicle 100. Thus, as will be described further below, at some times during the coasting operating state(s), when the vehicle 100 is coasting below a "torque converter lockup operational speed," the engine 108 may be disconnected from the drivetrain 102 by way of the mechanical clutch 104. For purposes of this disclosure, a torque converter lockup operational speed may be a relatively low speed where it would be undesirable from an NVH perspective to run the engine 108 with the torque converter 116 in a lockup or no-slip condition. In some of these cases, moreover, the MGU 110 may be capable of propelling the vehicle 100 by itself if additional power were demanded by the vehicle operator.

Example Hybrid Vehicle Operating Methods

Figure 2A:
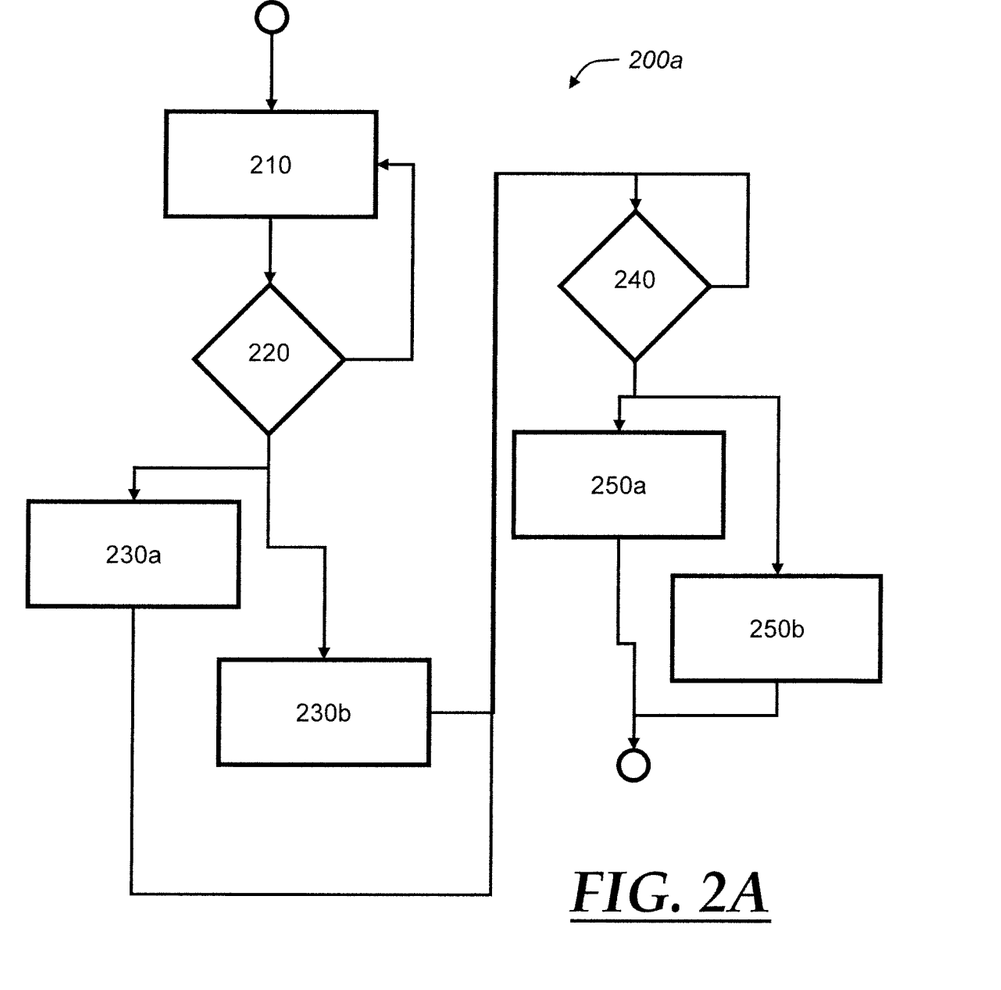
FIG. 2A is a process flow diagram for example methods of operating a vehicle having a disconnect device while coasting.
Figure 2B:
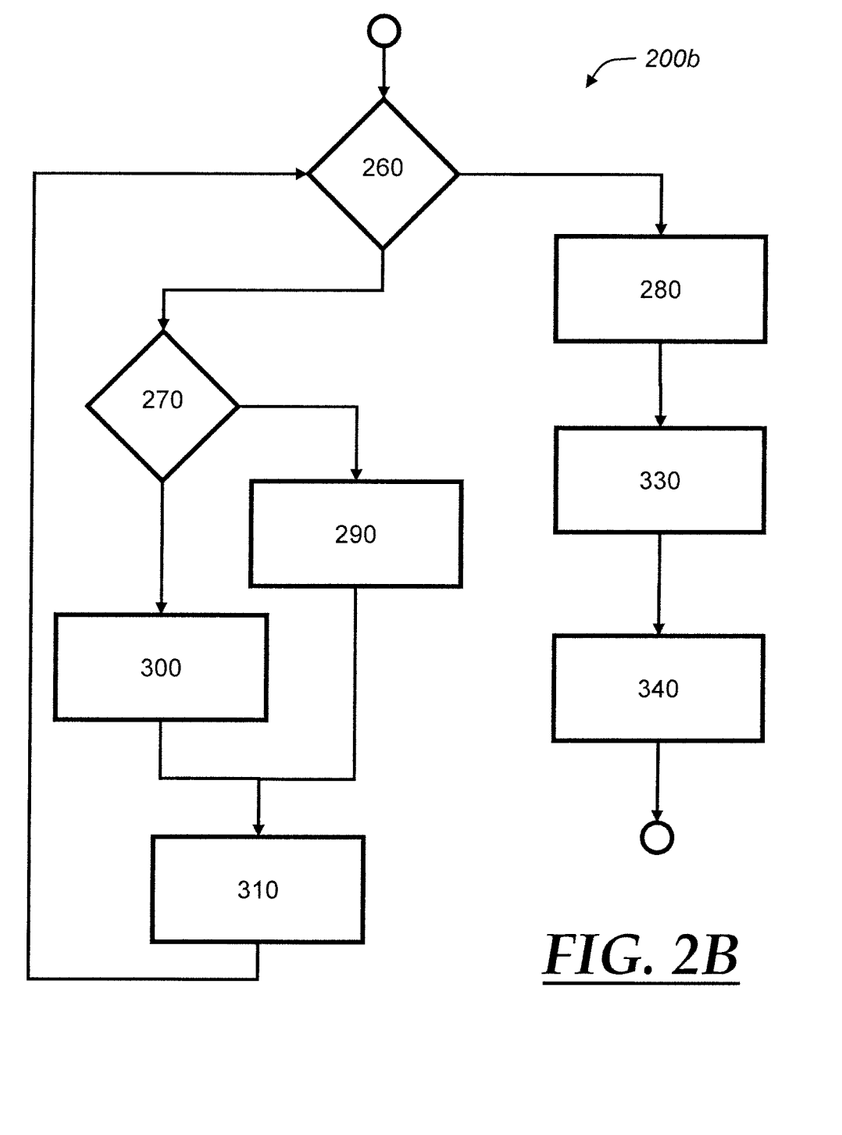
FIG. 2B is a process flow diagram for example methods of operating a vehicle having a disconnect device while launching the vehicle, e.g., from a stop.

Turning now to FIGS. 2A and 2B, example methods for use in conjunction with the example vehicles 100 and foregoing operating modes will be described in further detail.

In FIG. 2A, an example process 200a of coasting in a hybrid vehicle, e.g., vehicle 100, is illustrated. Process 200a may begin at block 210, when vehicle 100 is determined to be in a coasting operating mode. Process 200a may make this initial determination based upon the vehicle 100 not receiving any inputs from a driver to accelerate or otherwise not demanding additional vehicle power, e.g., via an accelerator of the vehicle 100, while traveling at an initial, non-zero, speed (i.e., the vehicle 100 is not stationary).

Proceeding to block 220, process 200a may query whether the engine 108 should be disconnected from the drivetrain 102. In one example illustration, the following factors may be considered to determine whether the engine should be disconnected.

First, process 200a may consider whether vehicle speed has fallen below a threshold where engine 108 should be turned off. Where the vehicle 100 is a relatively "strong" hybrid, i.e., with an MGU 110 that is relatively large and/or powerful, or otherwise capable of driving the vehicle 100 across a wide range of vehicle speeds, this threshold speed may be relatively higher, as the MGU 110 is capable of driving the vehicle 100 at higher speeds.

Process 200a may also consider whether the MGU 110 is capable of providing a desired acceleration, given current vehicle operating conditions. As with the first condition, this second condition may be more applicable in a relatively "mild" hybrid scenario, i.e., where the MGU 110 is less capable, as the MGU 110 may not be able to accelerate vehicle 100 above a certain threshold speed. Accordingly, this second condition may essentially amount to determining whether the MGU 110 is capable of providing adequate acceleration at the current speed of the vehicle 100. Process 200a may, as part of this determination, consider whether, should a driver of the vehicle 100 suddenly change power demands upon the vehicle 100 (e.g., by demanding acceleration), the vehicle 100 is capable of providing adequate acceleration without assistance from the engine 108. To determine whether the vehicle 100 is capable of providing a desired level of acceleration without the engine 108, e.g., using only the MGU 110, process 200a may consider any parameters or inputs of the vehicle 100 that are convenient. For example, process 200a may consider a vehicle road load power (i.e., the power needed to overcome road resistance at the present vehicle speed).

A third vehicle condition is a state-of-charge (SOC) of the vehicle battery. If a battery of vehicle 100 which supplies electrical power to the MGU 110 is fully charged, there is likely to not be any need to generate more power via regeneration, since battery is already fully charged.

A fourth condition to be satisfied at block 220 may be to determine whether an auxiliary device for providing pressure in a transmission or other needed vehicle subsystem(s) is activated or otherwise available. This condition generally seeks to determine whether any systems otherwise supported by the engine 108 would be negatively affected if the engine 108 were turned off. In the case of the auxiliary transmission pump, this condition may be satisfied if the auxiliary pump is on, such that pressure is still present in the transmission if the engine is turned off.

As noted above, in one example the above four conditions must each be satisfied in order to proceed from block 220 to blocks 230a/230b, below. However, in other example illustrations, additional conditions may be added to those set forth above, or a subset of one or more of any of the above conditions may be employed. Generally, any conditions may be used that may help determine that the vehicle 100 is in a driving condition where fuel consumption is likely to be reduced by disconnecting the engine 108 from the drivetrain 102, e.g., by utilizing the disconnect device 104.

In some example methods, a motor-generator capable calibration speed may be used in determining an operating state of the vehicle 100. As used herein, a motor-generator capable calibration speed may generally be a speed at which the MGU 110 may provide a desired acceleration to the vehicle without assistance from the engine 101. One consideration for the motor-generator capable calibration speed may include whether any or substantial negative drivability effects may result from the disconnection or reconnection of the engine 102, should there by a demand by the operator/driver for power beyond the capabilities of the MGU 110 alone. In some circumstances where the vehicle is at or below a motor-generator capable calibration speed (e.g., where the vehicle is coasting or is stopped and/or about to be launched from a stop), the engine may be turned by an external power source, e.g., the MGU 110 or the starter 107, in an effort to prevent negative drivability effects upon re-connection of the engine 102. Factors affecting the motor-generator calibration speed may include, but are not limited to, a vehicle weight, a motor-generator power, and an engine engagement capability with the transmission via the torque converter when the torque converter is in a non-slip condition.

Upon satisfaction of the initial query at block 220, e.g., based upon the conditions discussed above, process 200a may proceed to either block 230a or block 230b, depending on a particular intended application or calibration of the vehicle 100. Block 230a emphasizes fuel efficiency and is more intrusive in terms of shutting down/off the engine 108 to reduce fuel consumption in comparison to block 230b. Block 230b, on the other hand, emphasizes drivability and smoothness of the transitions between the operating states of the vehicle. Either may be selected for a given vehicle, depending on whether there is a desire to emphasize fuel efficiency or smoother drivability.

At block 230a, the engine 108 may be disconnected from the driveline 102 by opening the disconnect device 104. Additionally, torque output by the engine 108 may be reduced, and may eventually be stopped entirely. Regenerative braking by the MGU 110 may also be utilized if necessary (i.e., if demanded by the vehicle operator applying vehicle brakes) or to emulate engine braking. With the engine 108 stopped, the torque converter clutch 126 may be opened upon the vehicle 100 reaching a relatively low speed as the vehicle 100 continues to slow, eventually coming to a complete stop.

In the alternative block 230b, the engine 108 may be disconnected from the driveline 102, as in block 230a. However, in contrast to block 230a, at block 230b process 200a may keep the engine 108 idling (instead of turning the engine 108 off entirely, as in block 230a). The vehicle 100 may employ regenerative braking if demanded, and the torque converter clutch 126 may be opened as the vehicle reaches a relatively low speed, before coming to a complete stop. Block 230b may thus use comparatively more fuel by letting the engine 108 continue to idle or run as the vehicle 100 slows, but offer enhanced drivability and smoothness of the drivetrain 102 by not transitioning the engine 108 to an "off" state (and then starting the engine 108 again in response to subsequent demand for power by the vehicle operator).

From block 230b, process 200a may proceed to block 240. At block 240, process 200a queries whether the vehicle speed exceeds a torque converter lockup operational speed associated with the engine 108 and torque converter 116. As used herein and as introduced above, the lockup operational speed is a minimum speed of the vehicle 100 at which a lockup condition of the torque converter 116 (i.e., zero or minimal slip between the pump element 118 and turbine 120) may be tolerated without causing noticeable noise/vibration/harshness (NVH) to the vehicle 100. By contrast, when the vehicle 100 is moving at a speed below the lockup operational speed, lockup of the torque converter 116 may cause the engine to shudder or otherwise cause vibrations to travel through the drivetrain 102. The lockup operational speed of the vehicle may be higher than a vehicle speed based upon the cranking speed of the engine 108 (the cranking speed is defined as an engine/vehicle speed where the engine 108 may be fully engaged with the transmission 112 while the engine 108 is running, i.e., with the torque converter 126 locked or otherwise not allowing slippage between the pump element 118 and turbine 120. (Below the engine cranking speed, by contrast, the engine 108 may stall if the torque converter 116 is not opened or allowed to slip.) So long as the vehicle speed remains above the lockup operational speed (i.e., the result of query 240 is "no"), process 200a may remain at block 240. When the vehicle 100 speed eventually does fall below the lockup operating speed, process 200a may proceed to either block 250a or 250b.

At blocks 250a and 250b, process 200a may choose between different strategies for disconnecting the engine 108. In both of blocks 250a and 250b, the torque converter clutch 126 may be opened to allow slip between the pump element 118 and turbine 120.

From this point, the blocks 250a and 250b may involve different strategies, with the former emphasizing fuel efficiency and the latter emphasizing vehicle drivability. More specifically, at block 250a process 200a may use a motor of vehicle 100 to spin the engine 108, e.g., starter 107, or a second MGU (not shown) of the vehicle 100 that is configured to drive the pump element 118. In an example, the crankshaft may be kept spinning at an engine nominal speed, which may be between an engine cranking speed and idle speed, e.g., 200-300 rotations per minute (RPM). Fuel flow to the engine 108 may be cut, such that the engine 108 does not consume any fuel, thereby allowing some gain in fuel efficiency overall for the vehicle 100. By using the starter to spin the engine 108, the MGU 110 may continue to develop regenerative power from the vehicle 100. However, the use of the starter to spin the engine 108 limits the speed of the engine 108, as a starter motor typically is not capable of spinning the engine 108 above the engine cranking speed. In some vehicles, the relatively low speed of the engine 108 by way of the starter may cause some vibration or other harshness in the drivetrain 102. Accordingly, block 250a offers improved regenerative braking efficiency, at some slight disadvantage to drivability of the vehicle 100.

At block 250b, the MGU 110 is used to spin the engine 108, with fuel being cut off to the engine 108. In examples where the MGU 110 is configured to drive the pump element 118, e.g., as illustrated above in FIG. 1A, the MGU 110 may advantageously be able to spin the engine 108 at any speed necessary to keep the engine 108 synchronized with the drivetrain 102. Accordingly, improved drivability and smoothness in the drivetrain 102 may be achieved. However, this may sacrifice overall efficiency of the vehicle, to the extent the MGU 110 is not able to develop regenerative power while it is being used to drive the engine 108.

Each of the blocks 250a and 250b allow some gain in fuel efficiency by cutting off fuel to the engine 108, but each allow for improved drivability by keeping the engine 108 spinning, e.g., at an engine cranking speed (or approximately so). By spinning the engine 108 at the engine cranking speed or slightly above the engine cranking speed, should the vehicle 100 receive a demand to accelerate before it comes to a complete stop, the engine 108 is already spinning and more capable of providing power relatively very quickly in response to the demand. Accordingly, should the vehicle 100 be slowing to a relatively low speed and then suddenly accelerate (e.g., in a driver "change-of-mind" scenario, where the vehicle 100 is slowing down approaching a red light, which turns green before the vehicle 100 comes to a complete stop, causing the driver to demand acceleration before the vehicle 100 stops), the engine 108 is generally able to respond very quickly to the demand for increased power. The spinning of the engine 108 also promotes a relatively smooth re-engagement of the engine 108 with the drivetrain 102.

It should be noted that in situations where the vehicle 100 is coasting in a lowest gear of the transmission 112, the vehicle 100 may use a minimum speed associated with locked operation of the torque converter clutch 126 in determining whether to disconnect the engine 108. In other words, if the vehicle 100 is in a lowest-speed gear of the transmission 112 and coasting, the torque converter clutch 126 typically must be unlocked if the speed of the vehicle 100 falls low enough that the corresponding speed of the engine 108 is at or below a minimum cranking speed of the engine 108, as there is no lower gear of the transmission 112 available. By contrast, in situations where the vehicle 100 is coasting in a higher gear of the transmission and/or at a higher speed of the vehicle 100, the engine 108 may also be disconnected depending on whether the MGU 110 is capable of handling a driver change-of-mind (e.g., the vehicle 100 is slowing down, but then before coming to a complete stop acceleration is demanded by the driver) at the appropriate gear of the transmission 112 given the vehicle speed and acceleration requirements. Moreover, the reintegration of the engine 108 to providing propulsive power to the vehicle 100 from a disconnected state may be accomplished while maintaining good drivability by way of the relatively quick engagement of the disconnect device 104, and/or the external turning of the engine 108, e.g., by the MGU 110 or starter 107.

Turning now to FIG. 2B, a process 200b is illustrated for accelerating or launching a hybrid vehicle 100. Initially, at block 260, process 200b may query whether the vehicle speed is greater than zero, i.e., whether the vehicle 100 is moving. If the vehicle 100 is not yet moving, i.e., the result of block 260 is no, process 200b may proceed to block 270. At block 270, process 200b may query whether the MGU 110 of the vehicle 100 is connected to the pump element 118 or the turbine 120 of the torque converter 116.

Where the result of block 270 is "yes," e.g., the vehicle 100a has the configuration illustrated in FIG. 1A, process 200b proceeds to block 290. The vehicle 100a may use the MGU 110 to start the engine 108.

Alternatively, if the result of block 270 is "no," the vehicle 100b has the configuration illustrated in FIG. 1B, and process 200b may proceed to block 300. At block 300, process 200b may use a starter 107 of the vehicle 100 to start the engine 108.

From blocks 290 and 300, process 200b may proceed to block 310. At block 310, process 200b may use the engine 108 and the MGU 110 to provide power to the vehicle 100 upon a demand for acceleration, i.e., once the vehicle 100 begins to pull away from the stop. Process 200b may then proceed back to block 260.

Upon determination at block 260 that the vehicle 100 is moving, e.g., the vehicle 100 is pulling away from a stop, process 200b may proceed to block 280, where the torque converter clutch 126 may be opened or otherwise may allow slip between the pump element 118 and turbine 120. This opening or slippage may allow multiplication of torque applied to the pump element 118, e.g., by the engine 108 and/or the MGU 110, to facilitate acceleration of the vehicle 100. The engine 108 may also be started by the vehicle device designated by the result at block 270. More specifically, if there is a pump-side connection of the MGU 110 to the drivetrain (i.e., if MGU 110 is connected to the pump element 118, for example as illustrated in FIG. 1A), the MGU 110 may be used to start the engine 108. Alternatively, if the MGU 110 is connected on the turbine 120 side of the torque converter 116 (e.g., as illustrated in FIG. 1B), the starter 107 of the vehicle 100 may be used to turn the engine 108.

Proceeding to block 330, process 200b may, in examples where a second motor is available to spin the engine, e.g., the starter 107 or a second MGU (not shown), control the engine 108 speed using the second motor device. In some examples, the engine 108 speed may be matched to that of the driveline 102 or rotational input from the engine 108 to the driveline 102. Accordingly, even though the engine 108 is disconnected from the driveline 102 and fuel is cutoff from the engine 108 to achieve enhanced efficiency (i.e., by driving the vehicle 100 using the MGU 110), the speed of the engine 108 remains generally matched to the drivetrain 102, or at least is somewhat above the engine cranking speed. In this manner, upon a need for power to be supplied to the drivetrain 102, the engine 108 is already turning above the engine cranking speed- or even synchronized with the drivetrain- and can provide power to the vehicle 100 quickly and with a minimum of noise/vibration/harshness (NVH) resulting from the transition. It should be noted that the steps in block 330 are best deployed at relatively low speeds where the secondary motor or MGU, which may have a reduced overall power output compared with the MGU 110, is capable of maintaining the engine speed at or near that of the driveline 102 or a transmission input. Moreover, block 330 may generally not be an advantageous operating mode during positive power demand (e.g., vehicle accelerating or at steady speed). Rather, during positive power demand situations, it may be best, once the engine 108 is rotating, to provide fuel to the engine 108 and use the engine 108 to provide power.

At block 340, process 200b may use the engine 108 and MGU 110 to provide torque upon demand to the vehicle 100. In one example, as acceleration is demanded by the vehicle driver, the engine 108 may provide propulsive power to the driveline 102 to any extent the MGU 110 is incapable of doing so alone. Accordingly, the MGU 110 may be used at relatively lower speeds or when a low degree of acceleration is being demanded by the driver. As a result of the engine 108 being turned at a speed generally matching the driveline 102 (i.e., as described above in block 330), the engine 108 may be re-engaged to provide power as needed in a relatively smooth transition.

As noted above, various vehicle inputs may be analyzed in process 200a and/or 200b, or in conjunction with the various operation states of a vehicle, in order to determine control variables that are modified or adjusted by the vehicle 100. While examples are provided above including vehicle speed and a desired vehicle acceleration, any other inputs may be used that are convenient in helping determine a desired operating state of the vehicle 100, e.g., where it may be convenient to disconnect the engine 108 from the drivetrain 102 by utilizing the disconnect device 104. Merely by way of examples, other inputs that may be analyzed may include operating temperature(s) of the transmission 112 or MGU 110, a gear state of the transmission 112, e.g., whether "park," "reverse," "neutral," "drive," or a "low" gear is currently selected, or which numerical gear the transmission 112 is currently in, whether a brake pedal of the vehicle 100 is currently being applied (and/or to what degree), whether an accelerator (e.g., a pedal) of the vehicle 100 is currently being applied (and/or to what degree), the status of vehicle accessories drawing power, e.g., an air conditioner of the vehicle 100. The vehicle 100 may thus alter control variables including the disconnect device 104, starter 107, MGU 110, torque converter clutch 126, engine 102, auxiliary power module(s) of the vehicle, or brakes of the vehicle to achieve a desired operating mode or state.

Figure 3:
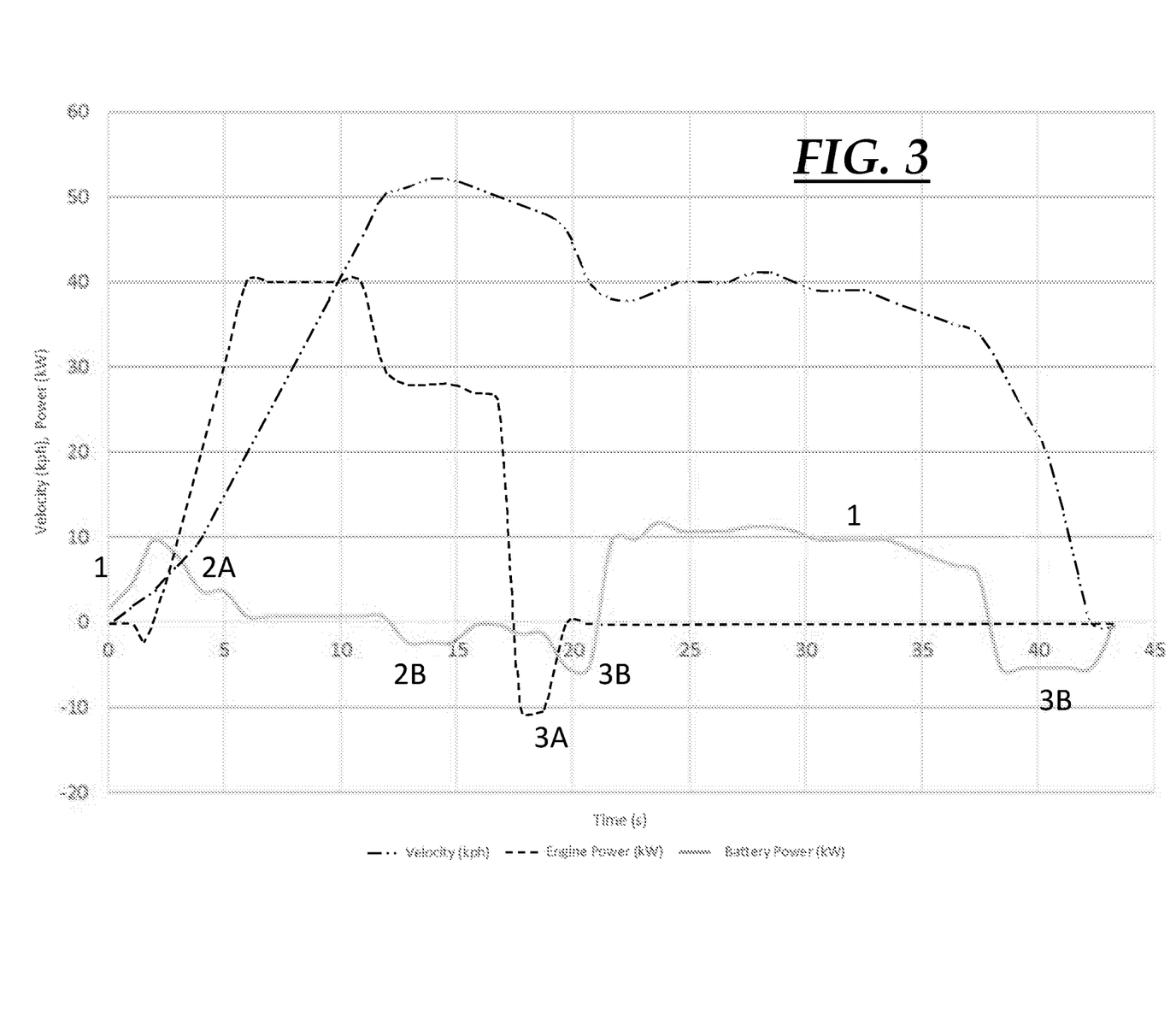
FIG. 3 is a graph illustrating vehicle speed, engine power, and battery power over time for an example hybrid vehicle employing example coasting and launch strategies illustrated in FIGS. 2A and 2B.

Turning now to FIG. 3, an example operation of a vehicle 100 is illustrated. The graph illustrated in FIG. 3 shows a speed of a vehicle 100 over time. The graph illustrates the vehicle 100 speed from an initial launch of the vehicle 100, through an initial phase of acceleration, and then through a coasting phase, with the vehicle eventually coming to a complete stop (i.e., where the vehicle speed returns to zero). The graph also illustrates power drawn by the MGU 110, and power output of the engine 108 along with the vehicle speed. Generally, where the engine power is below zero, the graph is indicative of the engine 108 being turned by a motor (e.g., MGU 110, starter 107, or the like) while not being fueled, such as described above in the example "powered" state.

Initially, the vehicle 100 may be launched from a stop in an EV drive mode, indicated by phase "1" in the graph of FIG. 3. Initially, the torque converter clutch 126 is opened or otherwise allowed to slip, with the vehicle power provided exclusively by the MGU 110 up until about 2 seconds elapsed time in the example illustrated. The engine 108 may be turned by the starter 107 or MGU 110—while not being fueled- to keep the engine 108 turning at a speed that is at least as great as a minimum engine cranking speed. In some cases, the engine 108 may be turned at a speed greater than the minimum engine cranking speed, e.g., at an engine idle speed, and in some limited examples may even be synchronized with a speed of the drivetrain 102. In so doing, the engine 108 may be smoothly turned back on and/or engaged with the drivetrain 102 should acceleration demands increase beyond the capabilities of the MGU 110.

As illustrated in the example of FIG. 3, after a few seconds elapsed time, the acceleration demanded of the vehicle 100 is greater than can be supplied by the MGU 110 alone, and the engine 108 is supplied with fuel and re-engaged with the drivetrain 102. As the engine 108 has been turned up to this point by the starter 107 or MGU 110, the engine 108 quickly and smoothly turns on, and re-engages with the driveline 102. Accordingly, in the phase "2A" illustrated in FIG. 3, the vehicle 100 is driving using the engine 108, with the MGU 110 providing assistive power. The torque converter clutch 126 may be eventually locked, as the engine 108 eventually takes over primary propulsive responsibilities from the MGU 110. The initial launch represented by phases 1 and 2A may be governed by the launch strategy described above in process 200b.

The vehicle 100 may use any conditions or vehicle parameters that are convenient to determine whether and how to activate the engine 108 or integrate the engine 108 from an off or disconnected state to provide propulsive power for the vehicle 100. For example, the vehicle 100 may use a battery state-of-charge, an engine/transmission temperature, a vehicle speed, a gear state of the transmission 112, a transmission pressure, and an accessory load of the vehicle (e.g., as determined by an electrical current draw of accessories from a vehicle alternator and/or a vehicle battery). The vehicle 100 may thus use the MGU 110 for propulsive power initially, i.e., in an electric vehicle only mode, in any number of ways. In one example, the vehicle 100 uses the MGU 110 for powering the vehicle, with the torque converter clutch 126 allowed to slip based upon vehicle speed (e.g., with slip decreasing and the torque converter clutch 126 eventually being locked in an example drivetrain 102a such as FIG. 1A, where the MGU 110 drives the transmission 112 via the torque converter 116), or remaining opened (e.g., in the example drivetrain 102b of FIG. 1B, where the MGU 110 drives the transmission 112 directly). In another example, the vehicle 100 employs the MGU 110 for propulsive power with the engine 108 disconnected, and the torque converter clutch 126 in a controlled slip or being locked. In another example, the vehicle employs the MGU 110 with an engine "spintrol" mode being employed, where the engine 108 is disconnected and turned, e.g., via the starter motor 107, to provide a quicker response from the engine 108 when demanded. In still another example, the vehicle 100 may use the starter 107 to start the engine 108, with the engine 108 speed then being increased to match that of the drivetrain 102 speed, i.e., such that the engine 108 may be reintegrated to provide assistive power to the vehicle 100. The torque converter clutch 126 may allow some level of slip to manage a smooth delivery of power from the engine 108 to the drivetrain 102.

As the vehicle continues to accelerate as elapsed time passes approximately 10 seconds, the MGU 110 is no longer needed for meaningful assistive propulsive power, and the MGU 110 may be switched off or may even transition to a generating mode to present an additional load to the engine (phase "2B"). This mode raises the operating load and efficiency of the engine 108 while charging the vehicle battery. The vehicle 100 may use a state of charge of the battery in making the determination to shift the MGU 110 from providing propulsive power to the vehicle. For example, if the battery associated with the MGU 110 is fully charged, there may not be a need to use the MGU 110 to generate electrical power as the battery is already fully charged. If, on the other hand, the battery is not fully charged or below some threshold charged state, the vehicle 100 may use this as a factor in determining whether to switch the MGU 110 from providing propulsive power to regenerating electrical power. With the MGU 110 now regenerating in the example illustrated in FIG. 3, the engine 108 generally splits its power between driving the MGU 110 and propelling the vehicle 100 in some desired proportion. Accordingly, in the example illustrated in FIG. 3, battery power drawn drops below zero, indicating a net charge of the vehicle battery. The torque converter clutch 126 may generally remain locked during this phase, while the engine 108 continues to provide power to the vehicle 100.

Subsequently, in phase "3A" of the graph of FIG. 3, the vehicle 100 stops accelerating, and begins coasting, such that a deceleration of the vehicle 100 occurs. The vehicle 100 may also be subject to a braking demand from the vehicle operator, which may be provided solely by MGU 110 via regenerative braking, or by the MGU 110 in tandem with other (mechanical) vehicle brakes. The MGU 110 continues generating power, while the engine 108 is placed into the deceleration fuel cutoff (DFCO) mode. The DFCO mode is generally represented in the graph of FIG. 3 by the engine 108 power dropping below zero, indicating a net negative power as a result of the power needed to turn the engine 108. The torque converter clutch 126 may remain locked, with the disconnect clutch 104 activated such that the engine 108 applies some resistance to the drivetrain (negative engine power) due to its internal pumping and friction.

The vehicle may then continue to regenerate power using the MGU 110 near the end of phase "3A," where the engine 108 is disconnected, e.g., via disconnect clutch 104 (zero engine power) while the torque converter clutch 126 remains locked, and the vehicle 100 is continuing to regenerate power via the MGU 110. As illustrated in the example in FIG. 3, the engine 108 is stopped as indicated by the engine being at zero power. The engine 108 may be stopped, in part, because the vehicle is generally decelerating, and thus little benefit to spinning the engine 108 in the continued absence of demand.

Alternatively, the engine 108 may be rotated by an external power source in any manner that is convenient, e.g., if there is an expectation that there will be a demand for power from the engine 108 and thus may need to be reengaged with the drivetrain 102. For example, at this stage the engine 108 may be rotated at low speed by the starter 107, if capable, or if the driveline is in the configuration 102a illustrated in FIG. 1A, the MGU 110 may cease regenerating power and be used to spin the engine 108 instead. In examples where it is desired to spin the engine 108, the engine 108 may be turned at a speed greater than a minimum engine cranking speed, but may be less than idle speed, e.g., approximately 200-300 RPM.

The vehicle 100 may use various operating conditions to determine whether to initiate a disconnect of the engine 108. Merely as examples, the vehicle 100 may use a battery state-of-charge, an engine or transmission temperature, vehicle speed, gear state of transmission 112, and an accessory load of the vehicle 100 (i.e., any electrical demands of the vehicle). Thus, while the vehicle 100 is in phase 3A illustrated in FIG. 3, the vehicle 100 may either (1) regenerate power using MGU 110 with the engine 108 in a DFCO state and the torque converter clutch 126 locked; (2) disconnect the engine 108 to maximize regeneration of power by the MGU 110, (3) perform an engine "spintrol" function where the engine 108 remains connected to the torque converter 116, but with the torque converter clutch 126 open to improve drivability at lower speeds, or (4) run the engine 108 at an idle speed with the engine 108 disconnected, e.g., via the clutch 104.

In the example illustrated in FIG. 3, the engine 108 is stopped as indicated in phase 3B, with the vehicle 100 continuing regenerating power using the MGU 110. The engine 108 is disconnected to maximize the regeneration of power. Eventually, the vehicle 100 transitions back to a positive power EV drive state (at approximately 25 seconds elapsed time) due to a demand for vehicle acceleration that is relatively small. In other words, the vehicle continues at an approximate constant speed which the MGU 110 is capable of providing without assistance from the engine 108, i.e., from approximately 22 seconds elapsed time to approximately 38 seconds elapsed time. Consequently, the engine 108 remains disconnected during this time period. The torque converter clutch 126 may remain locked, with the engine 108 disconnected via the one-way clutch 104a or 104b.

The vehicle 100 is shown subsequently reverting to a regenerative state at approximately 38 seconds elapsed time. At this time, the engine 108 may be disconnected and stopped (or, alternatively, may be turned by either the starter 107 or MGU 110), e.g., consistent with the coasting strategy discussed above with respect to process 200a. The vehicle 100 may then come to a complete stop, as indicated at approximately 44 seconds elapsed time.

The vehicle 100 and example processes 200a and 200b may allow an engine 108 to be disconnected at times when it may be advantageous to maximize vehicle efficiency. At the same time, the coasting and launching strategies discussed above may allow improved drivability by synchronizing a speed of the engine 108 with the drivetrain 102.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A method of operating a hybrid powertrain for a vehicle, comprising:
    (a) providing a powertrain for the vehicle comprising an internal combustion engine configured to provide rotational power to a rotatable input of a transmission by way of a starting device, an electric motor-generator comprising a rotor configured to selectively provide rotational power to the rotatable input; and
    (b) selectively disconnecting the engine from the rotatable input using a disconnect device separate from the starting device, thereby allowing the rotatable input of the transmission to be driven at a speed faster than an output speed of the engine;
    (c) turning the engine with one of the motor-generator and a starter motor of the engine while cutting fuel to the engine; and
    (d) determining that the vehicle is at or below a motor-generator capable calibration speed, wherein the motor-generator is capable of meeting a vehicle acceleration requirement without assistance from the engine, wherein the engine is turned with the one of the motor-generator and the starter in response to the determination, and wherein determining that the vehicle is at or below a motor-generator capable calibration speed includes determining that the vehicle is one of stationary and coasting.

2. The method of claim 1, wherein the starting device is a torque converter comprising a pump element and a turbine separated by a fluid coupling.

3. The method of claim 1, further comprising driving the rotatable input of the transmission using the motor-generator while the engine is disconnected using the disconnect device.

4. The method of claim 1, further comprising determining the motor-generator capable calibration speed from at least a vehicle weight, a motor-generator power and an engine engagement capability with the transmission via a torque converter when the torque converter is in a non-slip condition.

5. The method of claim 1, wherein the engine is disconnected in response to a determination that the vehicle is coasting, wherein the method further includes:
    (c) detecting a demand for an acceleration of the vehicle after step (b); and
    (d) in response to the determination in step (c), providing rotational power to the rotational input using one of the electric motor-generator and a vehicle starter.

6. The method of claim 1, wherein the disconnect device is a mechanical clutch.

7. The method of claim 6, wherein the mechanical clutch includes one of a one-way clutch, a selectable one-way clutch, and a mechanical diode.

8. The method of claim 2, wherein the disconnect device is interposed between the engine and the pump element of the torque converter, and the electric motor-generator is configured to drive the pump element of the torque converter.

9. The method of claim 2, wherein the disconnect device is interposed between the turbine of the torque converter and the transmission, and the electric motor-generator is configured to drive the rotational input of the transmission.

10. The method of claim 1, wherein the vehicle is a mild hybrid, wherein the engine is a primary motive power source for the powertrain, and the motor-generator is a secondary motive power source for the powertrain.

11. The method of claim 1, further comprising launching the vehicle from a stop while the engine is disconnected from the rotational input.

12. The method of claim 11, further comprising reconnecting the engine in response to a demand for power exceeding an output capability of the electric motor-generator.

13. A hybrid vehicle, comprising:
a final drive unit driving at least one vehicle wheel; and
a drivetrain providing motive force to the final drive unit, the drivetrain including:
an internal combustion engine configured to provide rotational power to a rotatable input of a transmission through a starting device;
an electric motor-generator configured to drive the rotational input of the transmission, such that the electric motor-generator is configured to selectively provide rotational power to the transmission; and
an engine disconnect device separate from the starting device, the disconnect device configured to allow the rotatable input of the transmission to be driven at a speed faster than an output speed of the engine;
wherein the engine is configured to be selectively disconnected from the rotatable input by the engine disconnect device, and the engine is configured to be turned with one of the motor-generator and a starter motor of the engine while fuel is cut to the engine; and
wherein the drivetrain is configured to determine that the vehicle is at or below a motor-generator capable calibration speed, wherein the motor-generator is capable of meeting a vehicle acceleration requirement without assistance from the engine, wherein the drivetrain is configured to turn the engine with the one of the motor-generator and the starter in response to the determination, and wherein determining that the vehicle is at or below a motor-generator capable calibration speed includes determining that the vehicle is one of stationary and coasting.

14. The vehicle of claim 13, wherein the disconnect device is one of a one-way clutch, a selectable one-way clutch, and a mechanical diode.

15. The vehicle of claim 13, wherein the starting device includes a torque converter comprising a pump element and a turbine separated by a fluid coupling.

16. The vehicle of claim 15, wherein the disconnect device is interposed between the engine and the pump element of the torque converter, and the electric motor-generator is configured to drive the pump element of the torque converter.

17. The vehicle of claim 15, wherein the disconnect device is interposed between the turbine of the torque converter and the transmission, and the electric motor-generator is configured to drive the rotational input of the transmission.

18. A method of operating a hybrid powertrain for a vehicle, comprising:
(a) providing a powertrain for the vehicle comprising an internal combustion engine configured to provide rotational power to a rotatable input of a transmission by way of a starting device, an electric motor-generator comprising a rotor configured to selectively provide rotational power to the rotatable input; and
(b) selectively disconnecting the engine from the rotatable input using a disconnect device separate from the starting device, thereby allowing the rotatable input of the transmission to be driven at a speed faster than an output speed of the engine;
(c) turning the engine with one of the motor-generator and a starter motor of the engine while cutting fuel to the engine;
(d) determining that the vehicle is at or below a motor-generator capable calibration speed, wherein the motor-generator is capable of meeting a vehicle acceleration requirement without assistance from the engine, wherein the engine is turned with the one of the motor-generator and the starter in response to the determination; and
(e) determining the motor-generator capable calibration speed from at least a vehicle weight, a motor-generator power and an engine engagement capability with the transmission via a torque converter when the torque converter is in a non-slip condition.

19. The method of claim 18, wherein the starting device is the torque converter.

20. The method of claim 18, wherein the torque converter comprises a pump element and a turbine separated by a fluid coupling.

* * * * *